Feb. 25, 1936. W. E. JOHNSTON 2,032,284
PRESSURE REGULATING VALVE
Filed May 6, 1933

Inventor
WAYBURN E. JOHNSTON
By
Chas. C. Reif
Attorney

Patented Feb. 25, 1936

2,032,284

UNITED STATES PATENT OFFICE 2,032,284

PRESSURE REGULATING VALVE

Wayburn E. Johnston, Minneapolis, Minn.

Application May 6, 1933, Serial No. 669,700

8 Claims. (Cl. 137—153)

This invention relates to a valve of the pressure regulating type. Such valves are now commonly used in quite a few places where it is desired to control the flow of fluid at or between certain pressures.

Said valves are of three general types, the diaphragm type, bellows type, and the plunger type. In practically all of these types a spring acting on one side of the diaphragm, bellows or plunger holds a valve member closed, said diaphragm, bellows or plunger being moved by pressure of fluid against said spring to open the valve. While, as stated, said valves have various applications, one common use of the valves at present is in regulating the discharge of oil for modern oil burners used to heat residences and other buildings. In such burners the oil is discharged through a nozzle and it is desired to maintain a certain pressure on the oil so that oil is discharged through the nozzle at this pressure. Pressure valves of the type to be disclosed herein comprise a valve casing having a chamber with an outlet leading therefrom which is to be connected to a nozzle, said outlet being controlled by a valve adapted to open at a certain pressure, say 85 pounds. There is another outlet passage through which oil is bypassed either to the supply tank or to the intake line of the pump which supplies the oil, which valve is adapted to open at a higher pressure, say 100 pounds. With such a construction the first valve which will be referred to as a primary valve, opens first, and more oil being supplied by the pump than is discharged at the nozzle, pressure soon rises to 100 pounds when the second valve opens and the oil is thus bypassed and a pressure of substantially 100 pounds maintained. The said types of valves used employ springs which oppose either the diaphragms or plungers used, and in the valves of the prior art these springs have usually been of substantially the same length.

Such valves of the prior art have in use with oil burners produced an objectionable result. As is well known, air is usually supplied by a fan which is mixed with the oil atomized by the nozzle. The fan and oil pump are driven from the same motor. When the burner is started, the pressure rises almost instantly and the valve controlling the flow of oil to the nozzle opens quickly and really before sufficient air is present to mix with the oil atomized by the nozzle to give a perfect combustion. A cloud of black smoke or smudge appears as the burner is ignited and starts operation. When the burner is shut down, usually under automatic control of a thermostat, the fan is stopped and the oil pump is stopped. There is a certain inertia, however, and oil is supplied for a brief period after the motor is shut off. When the motor is shut off, the pressure drops in the pressure valve casing and the pressure dropping below 100 pounds, the bypass valve closes at once. After this valve closes, however, oil continues to be supplied and this oil must pass out of the primary valve to the nozzle. The result is that oil is supplied to the nozzle for a short period when there is not sufficient air to properly burn this oil, and a smudge results in the fire chamber. Various means have been proposed to correct this and a special design of motor has even been proposed.

It is an object of this invention to provide a very simple and efficient structure of valve which completely eliminates the above objectionable result.

It is a further object of the invention to provide a structure of pressure regulating valve having the primary and secondary valves moving to pressure regulating positions respectively at substantially a certain pressure and a higher pressure, together with means holding the primary valve in closed position but movable under pressure for said valve to open through a comparatively short range of pressure, and also having means holding the second valve in closed position but movable under pressure but over a much greater range of pressure than said first mentioned means for said secondary valve to open.

It is another object of the invention to provide a pressure regulating valve having a chamber to which fluid is supplied under pressure, an outlet passage from said chamber, a primary valve controlling the flow of fluid through said outlet passage, resilient means holding said valve in closed position but movable under pressure for said valve to open, said means acting quickly, a second outlet passage from said chamber, a second valve for controlling said latter passage, resilient means for holding said second valve in closed position but movable under pressure with a much slower movement than said first mentioned means, for said second valve to move to open position.

It is more specifically an object of the invention to provide a pressure regulating valve comprising a casing having a chamber therein to which fluid is supplied under pressure, an outlet leading from said chamber, a primary valve controlling said outlet, a quite flexible spring holding said valve in closed position but movable quickly for said valve to move to open position at substantially certain pressure, a second outlet passage from said chamber, a second valve controlling said second outlet passage, a stiff spring holding said second valve in closed position but movable under pressure much slower than said first mentioned spring, for said second valve to move to pressure regulating position at a higher pressure.

It is still further an object of the invention to provide a pressure regulating valve having a chamber therein to which fluid is supplied under pressure, an outlet passage leading from said chamber, a primary valve for controlling the flow of fluid through said passage, a comparatively long spring holding said valve in closed position but movable under pressure for said valve to open, a second outlet passage leading from said chamber, a second valve for controlling the flow of fluid through said second outlet passage, a comparatively short spring holding said second valve in closed position but movable under pressure for said valve to move to pressure regulating position.

It is also an object of the invention to provide a pressure regulated valve having a chamber therein to which fluid is supplied under pressure, an outlet passage leading from said chamber, a primary valve controlling the flow of fluid through said passage, means holding said valve in closed position but movable under pressure for said valve to open, a second outlet passage leading from said chamber, a second valve for controlling the flow of fluid through said second outlet passage, means holding said second valve in closed position but movable under pressure for said valve to move to pressure regulating position, said first mentioned means acting for said primary valve to open between the initial opening movement of said second valve and the time it reaches pressure regulating position.

These and other objects and advantages of the invention will be fully set forth in the following description made in connection with the accompanying drawing, in which like reference characters refer to similar parts throughout the several views, and in which:—

Figures 1, 2:
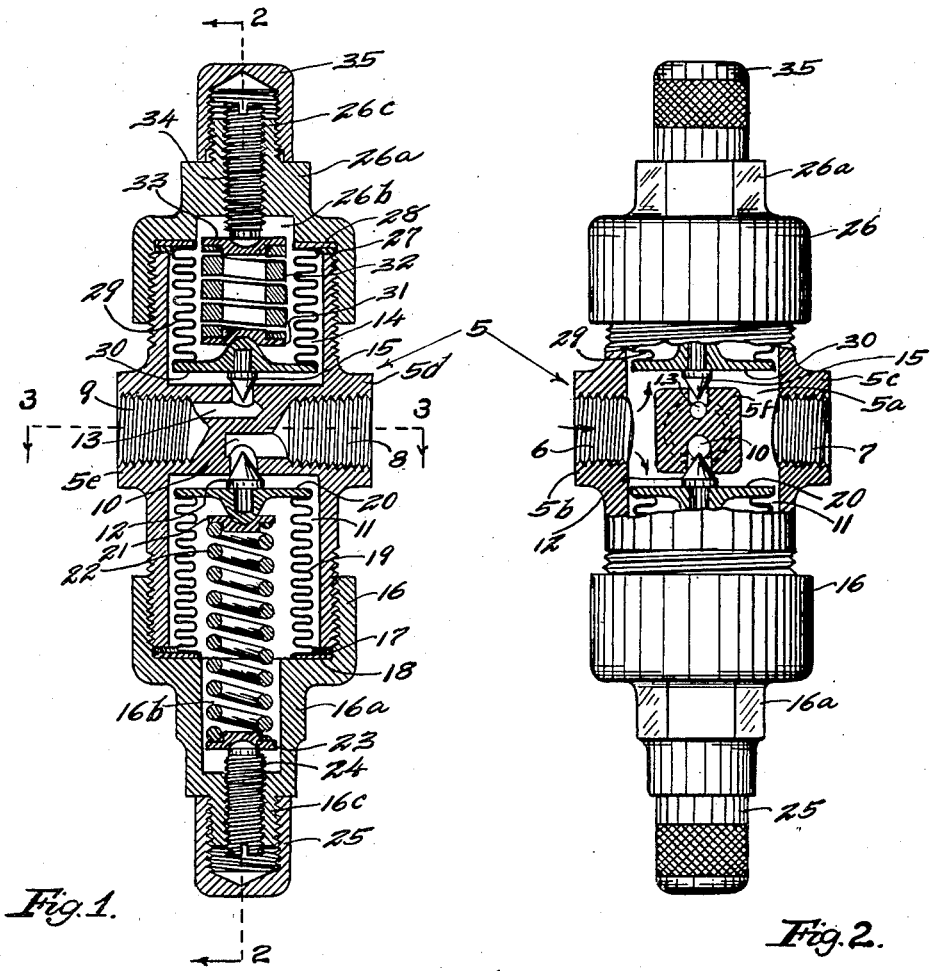
Fig. 1 is a central vertical section through the valve.
Fig. 2 is a view partly in side elevation as seen from the right of Fig. 1 and partly in central vertical section on line 2—2 of Fig. 1.
Figure 3:
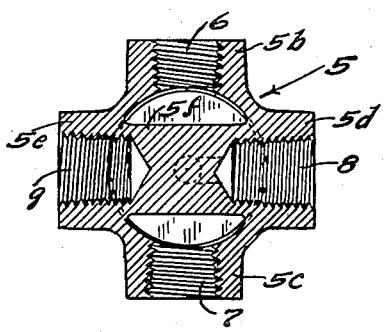
Fig. 3 is a horizontal section taken on line 3—3 of Fig. 1, said section being taken as indicated by the arrows.

Referring to the drawing, a valve is shown comprising a casing 5, said casing having therein a chamber 5a. Casing 5 has a boss 5b at one side bored and tapped to have the threaded opening 6 therethrough leading to chamber 5a, which opening is adapted to have connected thereto a pipe or conduit through which fluid such as oil is supplied to casing 5 under pressure. Said fluid is usually supplied by a pump and when such a valve is used in an oil burner, the passage 6 is connected to a conduit leading to the outlet of the pump which pumps the oil from a supply tank to said valve. Casing 5 has at the side opposite boss 5b another boss 5c. This boss is bored and tapped to have passing therethrough a threaded opening 7 also leading to chamber 5a. The opening 7 can be used to attach a pressure gauge used to indicate the fluid pressure so it can be read. Alternately opening 7 can be used as the inlet for the valve and opening 6 could then be used for the gauge. Casing 5 has another boss 5d midway between bosses 5b and 5c which boss is also bored and tapped to have passing therethrough a threaded opening 8 also communicating with chamber 5a. The opening or passage 8 is adapted to be connected to the discharge means for the oil and when the valve is used with an oil burner, opening 8 is connected to a pipe or conduit leading to the nozzle. Casing 5 has another boss 5e at the side opposite boss 5d, the same being bored and tapped to have a threaded opening 9 leading therethrough into chamber 5a. Passage 9 is adapted to have connected thereto a pipe or conduit leading to the relief opening for the valve and when the valve is used with an oil burner, passage 9 is connected to a pipe or conduit forming the by-pass which conducts the excess oil supplied to the valve back to the supply tank or to the inlet side of the pump. Casing 5 has connected thereto a block or diaphragm 5f disposed in chamber 5a which has an opening 10 therethrough leading from chamber 5a and another chamber 11 in one end of the casing 5 communicating therewith to discharge passage 8. A portion of opening 10 is cylindrical in form and block 5f extending thereabout forms a valve seat with which cooperates a valve 12 operative to close opening 10 and control the flow of fluid to passage 8. Block 5f has another passage 13 therethrough leading from chamber 5a and another communicating chamber 14 in the end of casing 5 opposite chamber 11 to passage 9, a portion of opening 13 being cylindrical and the portion of block 5f surrounding the same forming a valve seat with which cooperates a valve 15 closing opening 13 and controlling the flow of fluid to passage 9. The end of casing 5 having the chamber 11 therein is illustrated as cylindrical and exteriorly theaded adjacent its end to have screwed thereon the cap or end member 16 having a reduced end portion 16a of hexagonal form, bored to have the chamber 16b therein and having a further reduced end portion 16c exteriorly threaded. A gasket 17 of annular form is disposed over the lower end of casing 5 engaged by a washer 18 to which is secured the lower end of a bellows 19, washer 18 engaging the end of the largest bore in end member 16. A tight seal is thus made between members 19 and 5. The bellows 9 has a plate or plunger 20 at its end opposite washer 18 to which valve 12 is connected, said plate 20 having a semi-spherical central boss projecting from its under side engaged by a small plate 21 recessed centrally to fit over said boss on plate 20 and having a central portion of reduced diameter about which fits the end of a coiled compression spring 22 which bears against plate 21 and at its other end bears against a similar plate 23 also having a reduced projecting central portion surrounded by the end of said spring and having a semi-sperical recess in its lower side engaged by the rounded end of a screw 24. Screw 24 is threaded into the end of member 16, the same being illustrated as having a slotted lower end. A cuplike cap member 25 is screwed onto reduced portion 16c having a closed end, thus obscuring and protecting screw 24. The end of casing 5 containing chamber 14 is exteriorly threaded and has screwed thereon a cap or end member 26 having an internal bore and having a reduced portion 26a of hexagonal form having a smaller bore 26b therein. Member 26 has a further reduced end portion 26c exteriorly threaded. A gasket 27 of annular form is disposed over the upper end of casing 5 and engaged by a washer 28 contacting the end portion of the larger bore in member 26. Washer 28 has secured thereto the upper end of a bellows 29, the other end of which is secured to a plate 30 having a central upwardly projecting boss on its upper side of semi-spherical form. Valve 15 is secured centrally to the lower side of plate 30. A small plate 31 has a semi-spherical recess on its under side seated on the projection on plate 30, said plate 31 having a projecting portion of reduced diameter surrounded by the lower end of a coiled compression spring 32, the lower end of which bears against plate 31 and the upper end of which bears against a similar plate 33 also having a downwardly projecting reduced portion surrounded by said spring 32. It will be noted that spring 32 is much shorter than spring 22 and it is also a much stiffer spring than spring 22 being of much greater cross-sectional area than spring 22 and also being of rectangular or square cross section while spring 22 is of round or circular cross section. Plate 33 has a semi-spherical recess in its upper side engaged by the rounded lower end of a screw 34 threaded in the end of member 26 and projecting therefrom, said screw being shown as having a slotted outer end. A cup-like cap member 35 similar to the member 25 is threaded over portion 26c, thus enclosing and hiding screw 34. As shown in Fig. 2, cap members 25 and 35 are knurled on their exteriors for a portion of their lengths. It will also be seen that chambers 11 and 14 are tightly sealed against the escape of fluid except through openings 10 and 13 and that pressure of fluid in these chambers will tend to move plates 20 and 30 against the pressure of springs 22 and 32 respectively.

In operation fluid such as oil will be supplied through passage 6. This fluid will accumulate until a certain pressure is reached in chamber 5a. As above stated, opening 7 will be connected to a gauge and chamber 5a thus practically closed. The pressure increases until it reaches substantially a certain point, say 85 pounds, at which pressure plate 20 acting as a plunger is moved downwardly, compressing bellows 19 and spring 22, moving valve 12 to open position. The pressure in chamber 5a must, of course, rise until the pressure exerted on plate 20 exceeds the initial tension on spring 22. If, as stated, plate 20 and spring 22 are moved at a pressure of 85 pounds per square inch, then the initial tension on spring 22 is slightly less than 85 pounds times the area in square inches of plate 20. Spring 22 is long and quite easily flexed, being of circular and comparatively small cross section and has its action or compression through a short range of pressure. Valve 12 therefore opens comparatively quickly and valve 12 as stated is moved to open position. Spring 32 on the other hand is of much shorter length than spring 22 and is a stiffer spring than spring 22 being, as above stated and as illustrated, of much greater cross-sectional area than spring 22 and also of square or rectangular cross section. Spring 32 has its range of action or compression for opening valve 15 over a much greater range of pressure and as the pressure increases in chamber 5a, valve 15 really commences to open at much lower pressure than 85 pounds. It may begin its movement at, say 30 pounds, but when 100 pounds pressure is reached, it has been compressed so that valve 15 is opened to its pressure regulating position. It is obvious that the pressure in chamber 5a must increase until the total pressure on plate 30 exceeds the initial tension of spring 32. If, as stated, plate 30 and spring 32 are moved at 30 pounds pressure per square inch, then the initial tension on spring 32 is slightly less than 30 pounds times the area in square inches of plate 30. Plates 20 and 30 being of the same area it is thus seen that spring 22 is under much greater initial tension than spring 32.

When the valve is used with an oil burner as above described, and the pressure is regulated between certain points, say 85 and 100 pounds, valve 12 will be opened at 85 pounds and the pressure will increase to 100 pounds, at which time valve 15 will be opened as far as necessary to maintain the 100 pounds pressure, and excess oil supplied will be bypassed through the conduit connected to passage 9. When the burner is started, the pressure rises at once in chamber 5a and as stated when the total pressure on plate 30 exceeds the initial tension of spring 32, spring 32 begins to be compressed at about 30 pounds and valve 15 is opened somewhat. Some of the oil is thus bypassed and there is time for the air blast to be supplied in sufficient quantities to take care of all oil atomized before valve 12 opened. Valve 12 opened say at the 85 pound point or as soon as the pressure on plate 20 exceeded the initial tension of spring 22, and as stated, this valve opened quite quickly. Spring 22 is quite flexible due to its comparatively small and circular cross section and said spring is quite long and the same moves through its valve opening range very quickly. This quick flexure or movement is augmented by the spring also being quite long as it is an engineering fact that a certain load on a spring produces a certain amount of deflection per coil and the more coils there are the greater will be the total deflection of the spring for a given load. There is thus plenty of air to take care of the first oil sprayed and atomized by the nozzle and the formation of a cloud of black smoke or a smudge is prevented. When the burner is shut down and the motor which drives the air supplying fan and the oil pump stops, the pressure drops and when the pressure reaches substantially 85 pounds, valve 12 closes quickly and the passage of oil out through passage 8 to the nozzle is shut off. As soon as the pressure recedes from the 100 pounds which has been holding valve 15 open, said valve begins to close under the influence of spring 32. Spring 32, however, acts slowly and takes a much greater range of pressure for its complete action than does spring 22. At 85 pounds, therefore, spring 32 will not have expanded sufficiently to close valve 15, but said spring will continue to expand as the pressure drops and will finally close valve 15 at a much lower pressure than 85 pounds. As above stated, there is always some oil supplied to the valve after the motor has been shut off, due to the inertia of the moving parts. This oil thus which is supplied after the motor is shut off, can pass out through opening 13 past valve 15. The fire or blaze in the fire pot will thus be quickly extinguished as soon as valve 12 closes, and no more oil will be supplied after the air is insufficient to consume it. The formation of a smudge in the fire pot will thus be prevented. Valve 15 delays sufficiently in closing to permit the excess of oil supplied after the motor stops to pass out through passage 9 and through the bypass. It will be seen that springs 22 and 32 may each be adjusted by turning the screws 24 and 34 respectively.

From the above description it will be seen that applicant has provided a simple and efficient construction of pressure regulating valve which eliminates a long recognized objection to such structures. The valve has the desired action both when the pressure is increasing, and when the pressure is decreasing. The structure therefore produces a new and important result. The structure has been amply demonstrated in actual practice and found to be very successful.

The term "primary" is used to designate the valve 12 in the claims and valve 15 is referred to as the "second" valve. These terms are used merely for the purposes of readily differentiating or designating said valves and are in no sense terms of limitation.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. An oil control valve for an oil burner having in combination, a casing having a chamber therein to which oil is supplied, a passage leading from said chamber adapted to be connected to the nozzle of an oil burner, a valve controlling said passage and normally closing the same, a spring under initial tension holding said valve closed but movable under pressure exceeding its initial tension to permit said valve to open, a second passage leading from said chamber adapted to form a by-pass passage, a second valve for controlling said latter passage and normally closing the same, a spring under initial tension much less than the initial tension of said first mentioned spring normally holding said second valve closed but movable under pressure exceeding its initial tension to permit said second valve to open, said last mentioned spring being of much greater cross-sectional area and of much shorter length than said first mentioned spring, said last mentioned spring thus compressing more slowly than said first mentioned spring whereby said second valve will be permitted to open at a lower pressure than said first mentioned valve and upon decrease of pressure from a point above the opening pressure of said primary valve said primary valve will close before said second valve.

2. A valve structure adapted to be used with an oil burner having a discharge nozzle, having in combination, a casing having a chamber therein to which oil is supplied, an inlet passage to said chamber, an outlet passage leading from said chamber through which oil is supplied to said nozzle, a second outlet passage leading from said chamber through which oil is supplied to a by-pass conduit, a nozzle-controlling valve controlling the flow of fluid through said first mentioned outlet passage, a spring under initial tension holding said valve in closed position but movable under pressure exceeding said initial tension for said valve to open at substantially a certain pressure of oil in said chamber, a by-pass valve controlling the flow of fluid through said second outlet passage, a spring under initial tension less than said initial tension of said first mentioned spring holding said by-pass valve in closed position but movable under pressure exceeding its initial tension for said by-pass valve to open at substantially a certain pressure of fluid in said chamber somewhat lower than said first mentioned pressure, said last mentioned spring being of much less length and of greater cross sectional area than said first mentioned spring, whereby said nozzle-controlling valve will open quickly within a small range of pressure but said by-pass valve will open slowly through a much greater range of pressure and before said nozzle-controlling valve.

3. A valve structure having in combination, a casing having a chamber therein to which fluid is supplied, an inlet passage to said chamber, an outlet passage leading from said chamber through which fluid may pass to a discharge nozzle, a second outlet passage leading from said chamber through which fluid may pass to a by-pass conduit, a nozzle-controlling valve controlling the flow of fluid through said outlet passage, a by-pass valve controlling the flow of fluid through said second outlet passage, means under initial tension holding said by-pass valve in closed position but movable under pressure exceeding its initial tension for said by-pass valve to open and means under initial tension greater than said initial tension of said first mentioned means holding said nozzle-controlling valve in closed position but movable under pressure exceeding its initial tension for said nozzle-controlling valve to open, said last mentioned means being movable through its valve opening movement during a comparatively short range of pressure and intermediate of the beginning and ending of the valve opening movement of said second mentioned means.

4. A fluid controlling device having in combination, a fluid supply member, an inlet passage leading to said member, an outlet passage communicating with said member through which fluid may pass to a discharge nozzle, a second outlet passage communicating with said member through which fluid may pass to a by-pass conduit, a nozzle-controlling valve controlling the flow of fluid through said first mentioned outlet passage, a spring under initial tension holding said nozzle-controlling valve in closed position but movable under pressure for said valve to open, a second member against which fluid pressure exceeding said initial tension is exerted to flex said spring and open said valve, said spring being movable through its valve opening range during a small variation in pressure, a by-pass valve controlling the flow of fluid through said second outlet passage, a second spring under initial tension less than said initial tension of said first mentioned spring holding said by-pass valve in closed position but movable under pressure exceeding its initial tension for said by-pass valve to open, a third member against which pressure is exerted to flex said second spring and open said by-pass valve, said third member being of substantially the same area as said second member, said second spring being of much heavier cross section than said first mentioned spring and thus movable through its valve opening range during a much greater variation in pressure than said first mentioned spring whereby said nozzle-controlling valve will close before said by-pass valve when the pressure drops from a point where both valves have been opened.

5. A fluid controlling device having in combination, a fluid supply member, an inlet passage leading to said member, an outlet passage communicating with said member through which fluid may pass to a discharge nozzle, a second outlet passage communicating with said member through which fluid may pass to a by-pass conduit, a nozzle-controlling valve controlling the flow of fluid through said first mentioned outlet passage, resilient means having an initial tension holding said nozzle-controlling valve in closed position and movable to permit said valve to open under pressure exceeding said tension, said resilient means comprising a light long spring arranged to move through its valve opening range during a small increase in pressure over its initial tension, a by-pass valve controlling the flow of fluid through said second outlet passage, a resilient means under a lesser initial tension than said first mentioned resilient means holding said by-pass valve in closed position and movable under pressure exceeding its initial tension to permit said by-pass valve to open, said second resilient means comprising a short stiff spring arranged to move through its valve opening range during a much greater variation in pressure than said first mentioned resilient means whereby said by-pass valve will open before said nozzle-controlling valve as the pressure increases to a point above the opening of said nozzle-controlling valve and will close after said nozzle-controlling valve when said pressure decreases from said point to a point below the point at which said by-pass valve opened.

6. A valve structure having in combination, a casing having a chamber therein, an inlet passage to said chamber, an outlet passage leading from said chamber through which fluid may pass to a discharge nozzle, a second outlet passage leading from said chamber through which fluid may pass to a by-pass conduit, a nozzle-controlling valve controlling the flow of fluid through said first mentioned outlet passage, a resilient means under a certain initial tension holding said nozzle-controlling valve closed but movable upon a pressure exceeding said tension to permit said nozzle-controlling valve to open, a by-pass valve controlling the flow of fluid through said second outlet passage, a second resilient means under initial tension much less than said first mentioned resilient means holding said by-pass valve closed but movable under a pressure exceeding its initial tension to permit said by-pass valve to open, said second resilient means being much stiffer and of much less flexing extent than said first mentioned resilient means and movable through its valve opening range from a pressure of fluid in said chamber below that at which said nozzle-controlling valve opens to a pressure of fluid in said chamber above that at which said nozzle-controlling valve opens, whereby said by-pass valve will open before said nozzle-controlling valve and will continue its opening movement to a point above that at which said nozzle-controlling valve opens on increasing pressure and said nozzle-controlling valve will close before said by-pass valve upon pressure decreasing from said point.

7. A valve structure having in combination, a casing having a chamber therein, an inlet passage to said chamber, an outlet passage leading from said chamber through which fluid may pass to a discharge nozzle, a second outlet passage leading from said chamber through which fluid may pass to a by-pass conduit, a nozzle-controlling valve controlling the flow of fluid through said first mentioned outlet passage, a spring of round cross section and of comparatively small cross section under initial tension normally holding said nozzle-controlling valve closed but movable under pressure exceeding its initial tension to permit said valve to open, a by-pass valve controlling the flow of fluid through said second outlet passage, a second spring under initial tension much less than the initial tension of said first mentioned spring normally holding said by-pass valve closed but movable under pressure exceeding its initial tension to permit opening movement of said by-pass valve, said second spring being of much greater cross sectional area than said first mentioned spring and being of rectangular cross section and shorter than said first mentioned spring, the same having its valve opening movement through a much greater range of pressure than said first mentioned spring and upon increase of pressure having said movement from a point below the opening movement of said nozzle-controlling valve to a point above the opening movement of said nozzle-controlling valve, said by-pass valve thus on increase of pressure in said chamber opening before said nozzle-controlling valve and closing after said nozzle-controlling valve upon a decrease of pressure from said latter point.

8. A valve structure having in combination, a casing having a chamber therein, an inlet passage to said chamber, an outlet passage leading from said chamber through which fluid passes to a discharge nozzle, a second outlet passage leading from said chamber through which fluid passes to a by-pass conduit, a valve controlling the flow of fluid through said first mentioned outlet passage for controlling the flow of fluid to said nozzle, a spring under initial tension normally holding said valve closed but movable under pressure exceeding said tension to permit said valve to open, a by-pass valve controlling the flow of fluid through said second outlet passage, a second spring under initial tension much less than the initial tension of said first mentioned spring but movable under pressure exceeding its initial tension to permit said by-pass valve to open, said first mentioned spring being a very flexible spring and much longer than said second spring and moving through its valve opening range very quickly, said second spring being a very stiff spring and moving through its valve opening range through a large variation in pressure.

WAYBURN E. JOHNSTON.